(No Model.)
M. POTTER.
HANGER FOR VEHICLE BRAKE SHAFTS.
No. 534,282. Patented Feb. 19, 1895.
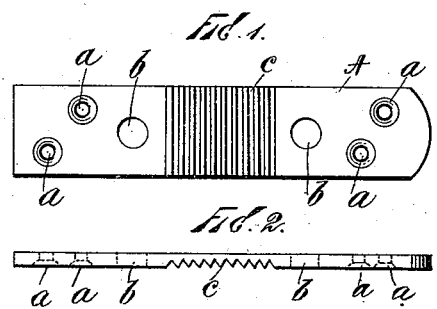
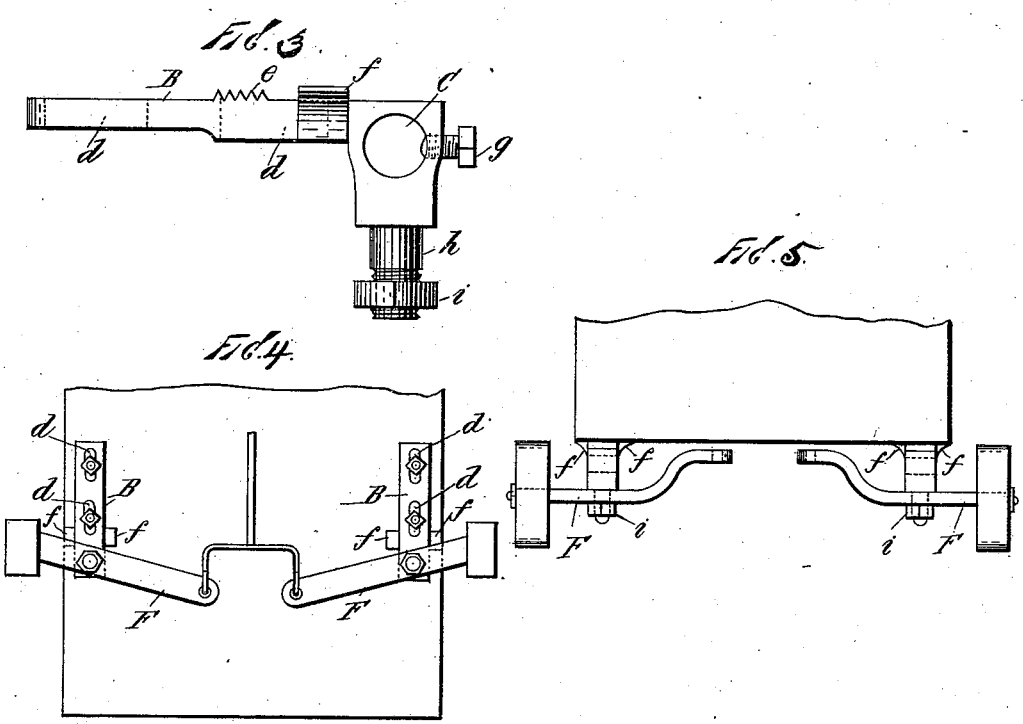
Witnesses:
John Buckler,
L. H. Osgood
Inventor:
Morgan Potter,
By North Osgood,
Attorney.

UNITED STATES PATENT OFFICE.

MORGAN POTTER, OF FISHKILL-ON-THE-HUDSON, NEW YORK.

HANGER FOR VEHICLE-BRAKE SHAFTS.

SPECIFICATION forming part of Letters Patent No. 534,282, dated February 19, 1895.

Application filed March 13, 1894. Serial No. 503,450. (No model.)

*To all whom it may concern:*

Be it known that I, MORGAN POTTER, a citizen of the United States, and a resident of Fishkill-on-the-Hudson, in the county of Dutchess and State of New York, have invented certain new and useful Improvements in Hangers for Vehicle-Brake Shafts, of which the following is a specification.

My invention relates to devices employed upon wagons, carriages and other vehicles to sustain the shaft or bar on which the brake block is carried and permit the shaft to be moved as may be required. Of these brake shafts two general types are most commonly employed, one known as the "roller" shaft which is capable of partial rotation in order to bring the brake blocks into or out of contact with the wheels,—and the other, known as the "whiffle-tree" bar which is pivoted or trunnioned and arranged to swing rather than revolve in order to carry the brake block in or out of working position.

The object of my invention is to provide a simple, cheap and efficient hanger which will accommodate either form of brake shaft mentioned above, hold it steadily and accurately in place, be capable of easy application and susceptible of adjustment within proper range so as to bring the shaft to the proper position, and be incapable of slipping when once adjusted. To accomplish all of this and to secure other and further advantages my improvements involve certain new and useful arrangements or combinations of parts and peculiar features of construction as will be herein first fully described and then pointed out in the claims.

In the drawings, Figure 1 is a plan of the under side and Fig. 2 a side elevation of the bed plate employed in connection with my improved hanger. Fig. 3 is a side elevation of the hanger. Fig. 4 is a plan view of the under side of a fragment of a vehicle body, and Fig. 5 a corresponding end elevation indicating the manner in which the whiffletree levers are applied.

In all the figures like letters of reference, wherever they occur, indicate corresponding parts.

A is the bed plate which is secured to the vehicle body or other point of advantage and in the right position, the preferable means of fastening it in place being by suitable screws which enter the countersunk openings $a\ a$. The plate A is provided with bolt holes $b\ b$ between which its under-surface is serrated as shown at $c$.

B is the base of the hanger, carrying at one end a lug which is perforated as at C to receive the roller shaft. This base is slotted as at $d\ d$ to admit the securing bolts which also pass through the bolt holes $b$ and on which the base may be adjusted lengthwise according to the length of the slots. Between the slots $d\ d$ is a serrated portion $e$ adapted to engage with the serrations $c$ where the hanger is located. The hanger being bolted to place on the bed plate, it will be plain that it cannot slip in the direction of its length, and the holding bolts are not relied upon for security in this direction. Side lugs $f\ f$ are employed on the hanger and these bear against the sides of the bed plate to prevent any possibility of side movements of the hanger when in place for use.

A set screw, as $g$, is employed to bear lightly against the roller shaft to prevent rattling in case the perforation in the hanger is or becomes too large. The form thus far described receives the roller shaft.

In some cases it may be desired to change the form of shaft which carries the brake block, or it may be desired to supply a hanger which will receive either the roller or the whiffle tree form of lever. For these I supply the perforated lugs of the hanger blocks with trunnions $h$, and on these the perforated whiffle-tree levers F are mounted, being held in place by suitable securing devices, as nuts $i$. The perforated lug of the hanger block is located at the end thereof so as to carry the shaft close up to any bar or other obstruction which is often encountered in locating these devices. The principal strains being upon the portion of the block carrying the perforated lug, I make this portion thickest or heaviest as shown and provide a suitable sized bolt to hold it. The side lugs $f\ f$ serve as braces or supports to obviate side racking of hanger block caused by sidewise jolting of vehicle—and they take the strain off the holding bolts as will be readily understood.

The improvements are cheap and durable and well calculated to answer the purposes or objects of the invention previously alluded to.

Having now fully described my invention, what I claim as new herein, and desire to secure by Letters Patent, is—

1. In a hanger of the character specified, the combination with the perforated lug carried by the hanger block, of the trunnion applied on said lug, and the brake shoe lever mounted on the trunnion substantially as shown and described.

2. The herein described hanger composed of the bed plate serrated as explained, a carrier block arranged to be adjusted on the bed plate, the perforated lug, trunnion, securing nut, and side lugs bearing against the bed plate, all constructed and combined substantially as shown.

Signed at Fishkill-on-the-Hudson, in the county of Dutchess and State of New York, this 8th day of March, A. D. 1894.

MORGAN POTTER.

Witnesses:
  M. E. CURTISS,
  THOS. ALDRIDGE, Jr.